US009308670B1

(12) United States Patent
Cubeta

(10) Patent No.: US 9,308,670 B1
(45) Date of Patent: Apr. 12, 2016

(54) LIGHTWEIGHT RESIN BASED POLYMER CONCRETE ARTICLES AND METHODS FOR MAKING

(76) Inventor: Richard A. Cubeta, Houston, TX (US)

( * ) Notice: Subject to any disclaimer, the term of this patent is extended or adjusted under 35 U.S.C. 154(b) by 367 days.

(21) Appl. No.: 13/071,338

(22) Filed: Mar. 24, 2011

(51) Int. Cl.
*E04C 1/40* (2006.01)
*E04C 1/41* (2006.01)
*B28B 23/00* (2006.01)
*E04C 2/288* (2006.01)
*B32B 3/18* (2006.01)
*B29C 70/68* (2006.01)
*B29C 70/70* (2006.01)

(52) U.S. Cl.
CPC ......... *B28B 23/0056* (2013.01); *B28B 23/0068* (2013.01); *B29C 70/68* (2013.01); *B29C 70/682* (2013.01); *B29C 70/70* (2013.01); *B32B 3/18* (2013.01); *E04C 2/288* (2013.01); *Y10T 428/233* (2015.01)

(58) Field of Classification Search
CPC ........ C04B 26/00; C04B 26/02; B04B 1/162; B04B 5/04; B04B 5/043; B04B 5/265; E04C 2/04; E04C 2/34; E04C 2/36; E04C 2/205; E04C 2/288; E04C 2/2885; E04B 1/20; E04B 1/162; B28B 23/0056; B28B 23/0038; Y10T 428/24999; B29C 70/68; B29C 70/682; B29C 70/70; C04C 1/40
USPC ......... 52/309.1, 309.12, 309.16, 309.17, 576; 428/314.2, 314.4, 315.7, 318.4, 319.3, 428/320.2, 71
See application file for complete search history.

(56) References Cited

U.S. PATENT DOCUMENTS

| 4,041,669 | A | * | 8/1977 | Rauenhorst | 52/576 |
| 4,373,058 | A | * | 2/1983 | Horton | 524/705 |
| 4,375,489 | A | * | 3/1983 | Muszynski | 428/35.8 |
| 7,895,799 | B2 | | 3/2011 | Hillman et al. | |
| 2009/0193749 | A1 | * | 8/2009 | Gembol | 52/649.1 |

FOREIGN PATENT DOCUMENTS

JP     2005042418 A * 2/2005

OTHER PUBLICATIONS

Harmony Sand & Gravel, Approximate Weights of Various Construction Material Per Cubic Yard, http://www.harmonysandgravel.com/charts.htm.*
Super-ellipse calculator available online at http://www.procato.com/superellipse/.*
Miller, Michele "Polymers in Cementitious Materials" Jan. 2005, Smithers Rapra, pp. 59-60, ISBN 1-85957-491-2.*

* cited by examiner

*Primary Examiner* — Gwendolyn Blackwell
*Assistant Examiner* — Lee Sanderson
(74) *Attorney, Agent, or Firm* — Buskop Law Group, PL; Wendy Buskop

(57) ABSTRACT

A cast lightweight construction article and methods of making the same are disclosed herein. The cast lightweight construction article can include a thermosetting resin composition, a low moisture content aggregate, and a catalyst that enhances hardening. The cast lightweight construction article can have a density ranging from about 120 pounds per cubic feet to about 170 pounds per cubic feet. The method can include forming the articles by inserting columns of a low density expanded polystyrene, low density urethane foam, low density polymerized alpha olefins, or combinations into a form, and pouring mixed liquid and dry materials into the form to cure.

7 Claims, 5 Drawing Sheets

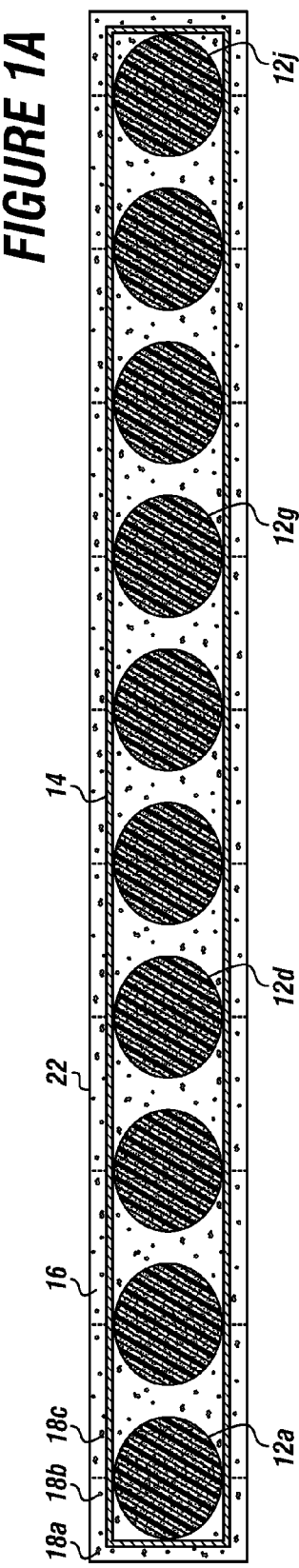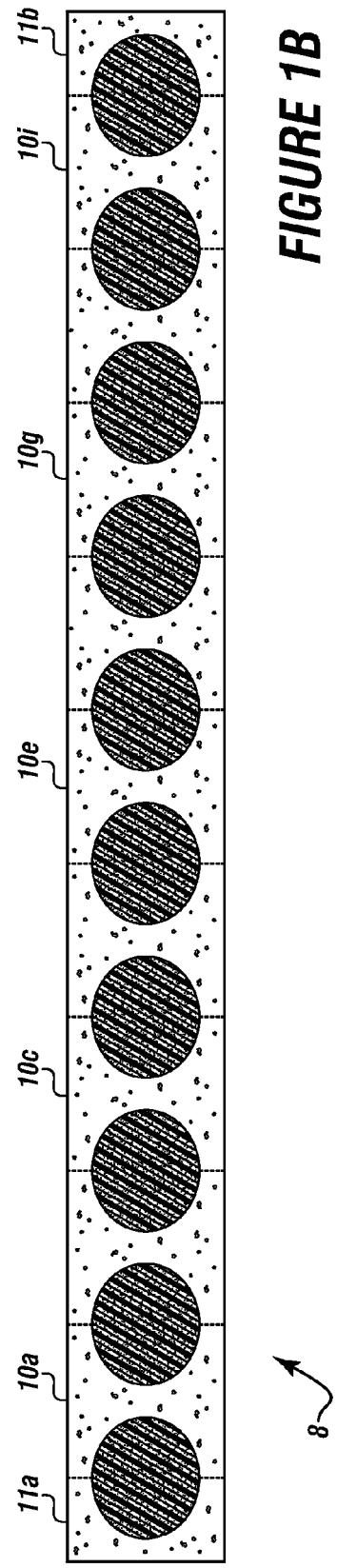

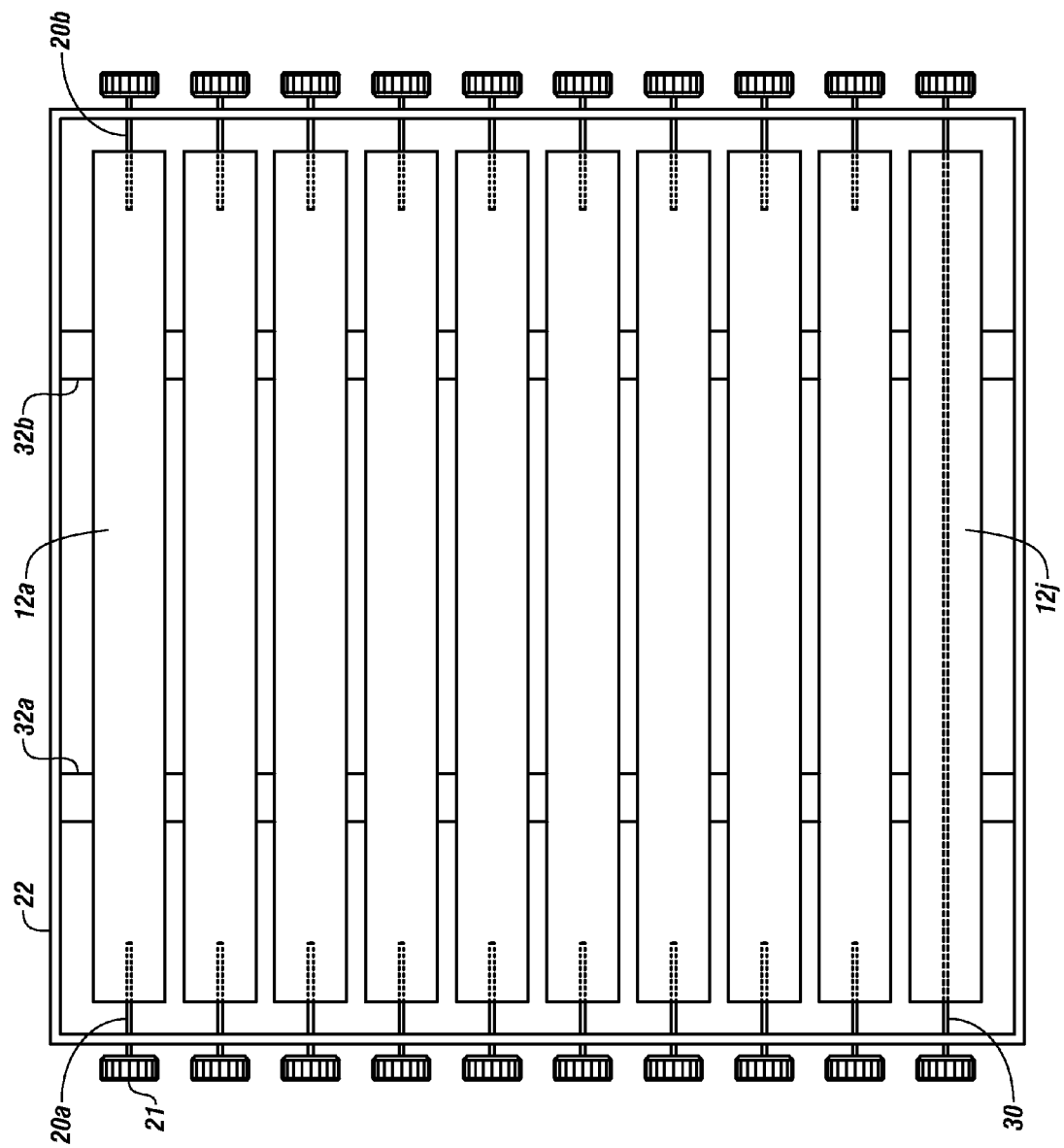

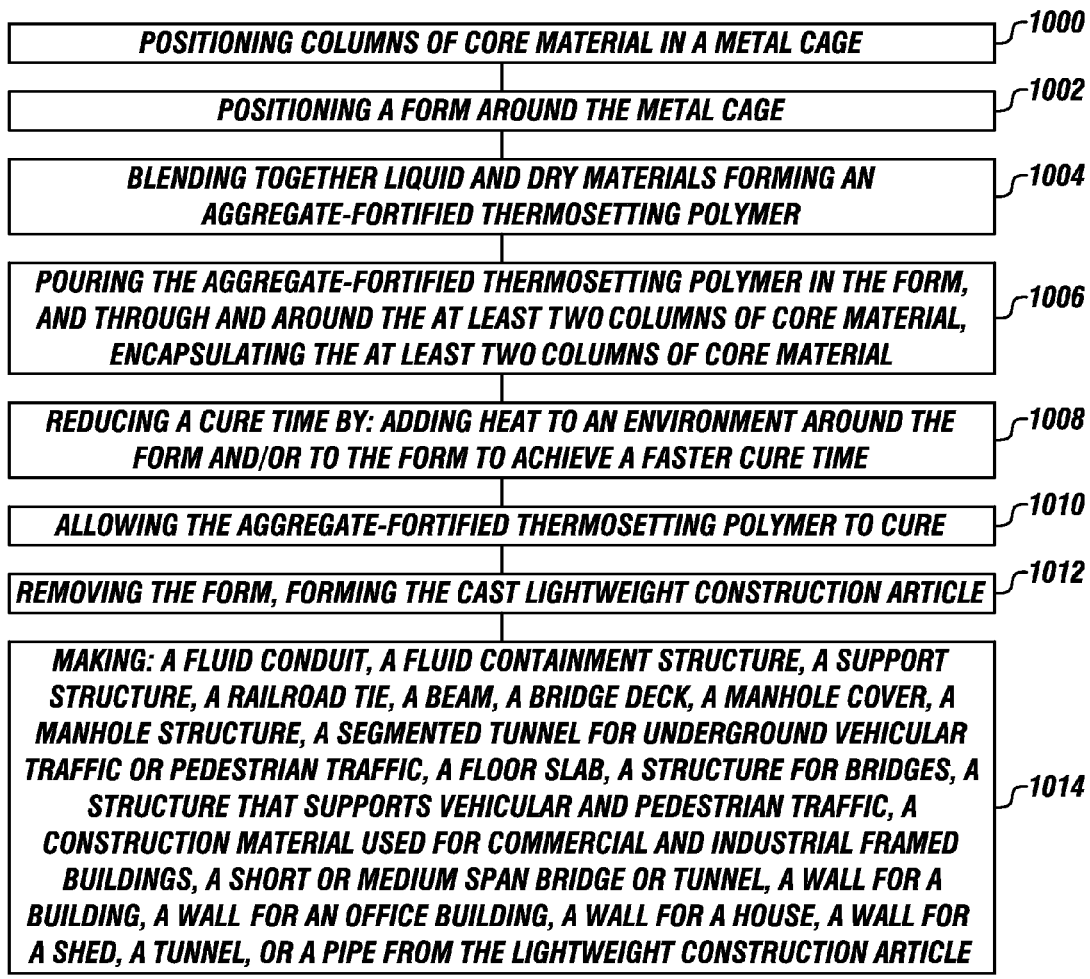

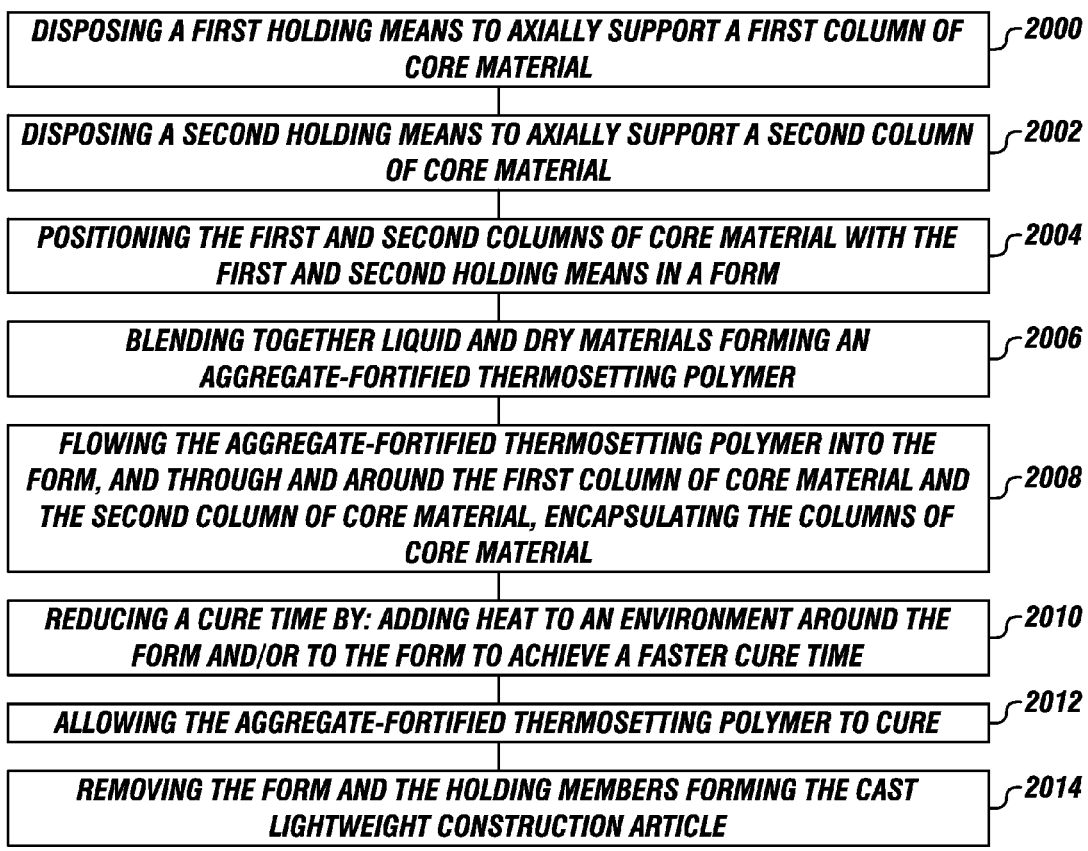

LIGHTWEIGHT RESIN BASED POLYMER CONCRETE ARTICLES AND METHODS FOR MAKING

FIELD

The present embodiments generally relate to a lightweight resin based polymer concrete article that can be used for the construction of bridges, subways, underground tunnels, large buildings, and other structures, as well as to methods for making the lightweight resin based polymer concrete article.

BACKGROUND

A need exists for a simple and easy method to make cast polymer concrete I-beams and other construction materials that are lighter in weight than solid versions of polymer concrete, while providing the same or similar load bearing attributes.

A need exists for a simple and easy method to make cast lightweight construction articles that provide higher strength structural characteristics of polymer concrete using agglomerates and a short cure time.

A need exists for a method to make cast polymer concrete I-beams and other construction materials usable for pipes, bridges, buildings, structures, and the like.

A need exists for a method of making lightweight construction articles, such as cast polymer concrete I-beams, which does not require heat.

A need exists for an accelerated method for making the lightweight constructions articles, such as cast polymer concrete I-beams.

The present embodiments meet these needs.

BRIEF DESCRIPTION OF THE FIGURES

The detailed description will be better understood in conjunction with the accompanying drawings as follows:

FIG. 1A depicts a cross sectional view showing a metal cage supporting the columns of core material that can be used in one or more embodiments of the method.

FIG. 1B depicts a cast lightweight construction article having I-beams and half I-beams.

FIG. 3 depicts a top view showing a form with different types of holding means for supporting the columns of core material to make the cast lightweight construction article in one or more embodiments of the method.

FIG. 4 depicts an embodiment of a method for making cast lightweight construction articles.

FIG. 5 depicts an embodiment of a method for making cast lightweight construction articles.

Figure 2:
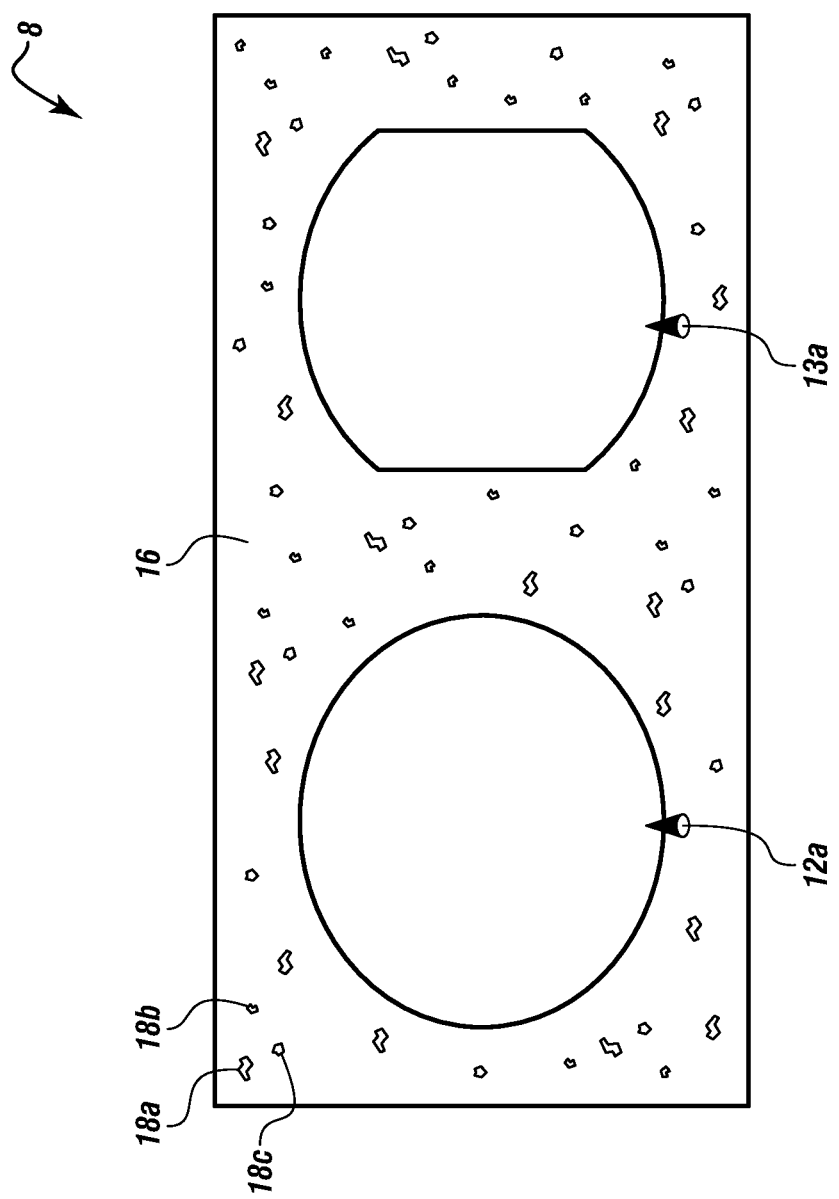
FIG. 2 depicts a cross sectional view of different shaped columns usable to form the cast lightweight construction article in one or more embodiments of the method.

The present embodiments are detailed below with reference to the listed Figures.

DETAILED DESCRIPTION OF THE EMBODIMENTS

Before explaining the present method and associated articles in detail, it is to be understood that the method and associated articles are not limited to the particular embodiments, and that the embodiments can be practiced or carried out in various ways.

The present embodiments relate to a cast lightweight construction article, which can be a formed lightweight solid polymer concrete construction article. The cast lightweight construction article can be a fluid conduit, a fluid containment structure, a support structure, a railroad tie, a beam, a bridge deck, a manhole cover, a manhole structure, a segmented tunnel for underground vehicular traffic or pedestrian traffic, a floor slab, another structure, or combinations of such structures.

The cast lightweight construction article can be used as a structure for bridges, a structure that supports vehicular and pedestrian traffic, a construction material used for commercial and industrial framed buildings, a structure for short and medium span bridges and tunnels, or other such structures.

For example, many short span bridges are constructed from a deck surface on top of a supporting structure that is often steel or pre-stressed concrete I-beams. The steel or pre-stressed concrete I-beams are heavy and difficult to move and install. A need exists for an I-beam that is structural and more resistant to corrosion, in-part by having reduced exposed raw materials.

One or more embodiments of the method can be used to produce cast lightweight construction articles with smooth outer surfaces and no exposed materials other than a formed aggregate-fortified thermosetting polymer.

The method can provide articles that can be at least partially made of recycled materials, yielding a positive, environmentally friendly, and green benefit.

One or more embodiments of the method can be used to produce articles with reduced weight, increasing an ability of the articles to be loaded on normal transport trucks and to be lifted by lighter weight lifting devices and equipment; rather than requiring the use of heavy lift trucks and heavy lifting devices and equipment. For example, the lifting devices and equipment can be cranes, fork lifts, and other conventional lifting devices.

The cast lightweight construction articles made by the methods described herein can lower energy costs that occur in transporting the materials to a construction site due, in-part, to the reduction in fuel costs.

The cast lightweight construction articles can have lower installation costs than other similar materials, in-part because their lighter weight can make them easier to handle, and can reduce or eliminate the need for heavy-duty equipment to move the articles. In one or more embodiments, the cast lightweight construction articles can be lifted easily by several individuals.

Embodiments of the cast lightweight construction article can lower overall raw material costs. For example, by using the columns of core material within the cast lightweight construction article, the resultant cast lightweight construction article can require less of an aggregate-fortified thermosetting polymer, which can be more costly than the columns of core material.

Formation of the cast lightweight construction articles can include using the columns of core material. The columns of core material can be rounded, squared, cylindrical, flattened elliptical shapes, or other shapes or configurations. The columns of core material can have a width and/or length that extends up to about 98 percent of a width and/or length of a form used to hold the aggregate-fortified thermosetting polymer used in the formation of the cast lightweight construction articles. As such, the columns of core material can be fully encapsulated within the aggregate-fortified thermosetting polymer.

For example, in one or more embodiments, the form can be 6 feet wide and 6 feet long, with the columns of core material being 5 feet and 5 inches wide and 5 feet and 5 inches long. In one or more embodiments, the columns of core material can be the length of the form.

Thickness of the columns of core material can vary. For example, in one or more embodiments, the columns of core material can be 5 feet and 5 inches long, 5 feet and 5 inches wide, and 3 inches thick. Larger dimensions of the columns of core material, such as greater thicknesses, can form lighter weight cast lightweight construction articles. As such, the thickness of the columns of core material can be adjusted and configured to produce lighter weight cast lightweight construction articles.

The columns of core material can be any size depending upon the desired physical properties for the resultant cast lightweight construction article. For example, the diameter and other dimensions of the columns of core material can be varied with respect the dimensions of the aggregate-fortified thermosetting polymer in order to adjust the final weight and final strength of the resultant cast lightweight construction article. If increased strength is needed, the thickness of the columns of core material can be reduced, such as to about 3 inches thick. If load support is not critical, the columns of core material can be from about 6 inches thick to about 10 inches thick.

The columns of core material can be large, solid, single-piece objects, rather than being a collection of a shredded filler.

In one or more embodiments, the columns of core material can be cylindrical spheres that can be mounted to the form using pins, rods, saddles, or other holding means. The columns of core material can be mounted inside a metal cage, and can then be encapsulated within a resin of the aggregate-fortified thermosetting polymer formed from a mixture of liquid and dry materials. The columns of core material can extend from one end of the metal cage or form to an opposite end of the metal cage or form, and can be completely encapsulated and surrounded by the aggregate-fortified thermosetting polymer.

The encapsulation of the columns of core material can provide the resulting cast lightweight construction article with structural integrity and an increased ability to resist degradation in harsh environments, such exposure to arctic ice or sea water. In one or more embodiments, the cast lightweight construction articles can have encapsulated foam columns of core material, which can be closed cell foam columns of core material, and can prevent degradation while reducing the weight of the final cast lightweight construction article. The method can also include using a resin of aggregate-fortified thermosetting polymer to form a structure that is less susceptible to deterioration related to exposure to corrosive environments.

One or more embodiments relate to a method for forming a lightweight construction article that includes positioning at least two columns of core material in a cage, which can be the metal cage, which can be disposed in the form. The cage and/or the form can have a bottom, a top, and at least one side connecting the top and the bottom. The cage can be square, rectangular, cylindrical, or circular. The cage can be contained within the form. The cage can be made of interlocking tubular metal or flat metal.

The columns of core material can be positioned within the cage. Each column of core material can be made of one or more of the following materials: a high or low density expanded polystyrene, a high or low density urethane foam, a high or low density polymerized alpha olefin, or combinations thereof, which can all be recycled materials. The columns of core material can be made of material of any density.

The low density expanded polystyrene can be Perform Guard® made by Foam Control EPS. The low density urethane foam can be Autofroth® made by BASF. The low density polymerized alpha olefin can be a polypropylene or polyethylene available from Shell Chemical Company. Polypropylene from recycled plastic soda bottles can be used to form the columns of core material. Urethane from recycled car seats and other discarded parts can be cut to form the columns of core material. Polystyrene from discarded shipping materials can be used and cut to form the columns of core material.

In embodiments, one column of core material can be made from a first material, and another column can be made from a second, different material. Also, all columns of core material can be made from the same material, and can have the same size. In embodiments, some columns of core material can have a first thickness, while others columns of core material have a second, different thickness.

In operation, the columns of core material can be uniformly positioned in the metal cage, and the metal cage can be positioned in the form.

The columns of core material can be disposed generally parallel to each other in the metal cage, and can form a layered effect with one layer of columns of core material disposed above another layer of columns of core material. A space can be formed between the layers of columns of core material, allowing for the resin of the aggregate-fortified thermosetting polymer to flow around each and every column of core material such that each column of core material is completely encapsulated by the resin of the aggregate-fortified thermosetting polymer.

The method can include blending together liquid and dry materials, such as for a time ranging from about 2 minutes to about 5 minutes, forming the aggregate-fortified thermosetting polymer. In one or more embodiments, the cure time can range from about 2 minutes to about 10 minutes. The liquid and dry materials can include from about 6 percent by weight to about 40 percent by weight of a liquid thermosetting resin composition, from 60 percent by weight to about 93 percent by weight of an aggregate; and from about 0.5 percent by weight to about 3 percent by weight of a liquid catalyst that enhances hardening of the resin of the aggregate-fortified thermosetting polymer.

The aggregate can be a low moisture content aggregate, and can have an average particle diameter ranging from about 6 microns to about 1.5 inches, a bulk density ranging from about 75 pounds per cubic foot (lbs/cu.-ft.) to about 160 lbs./cu.-ft.

The blended aggregate-fortified thermosetting polymer can have a density ranging form about 120 lb/cu.-ft. to about 170 lb/cu.-ft. A total weight percent of the aggregate-fortified thermosetting polymer can be 100 percent.

In one or more embodiments, small amounts of other usable materials can be added to the aggregate-fortified thermosetting polymer. For example, sparkles, flakes of mineral, glass that sparkles in the light, pigments, or other materials can be added to the aggregate-fortified thermosetting polymer in amounts ranging from about 0.1 percent by weight to about 3 percent by weight. The other usable materials can be added to the aggregate-fortified thermosetting polymer in amounts that would not affect the load bearing characteristics of the aggregate-fortified thermosetting polymer.

The method can include pouring the aggregate-fortified thermosetting polymer into the form, and through and around the columns of core material. As such, the columns of core material can be encapsulated by the aggregate-fortified thermosetting polymer.

The aggregate-fortified thermosetting polymer can be allowed to cure within the form at a low temperature for a cure time. The low temperature of the curing can range from about 50 degrees Fahrenheit to about 100 degrees Fahrenheit. The cure time can range from about 3 minutes to about 30 hours. In one or more embodiments, no extra heat is added during the curing of the aggregate-fortified thermosetting polymer.

Once cured, the form can be removed, forming a cast lightweight construction article. The formed cast lightweight construction article can have a load bearing property substantially similar to cast articles made from an identical aggregate-fortified thermosetting polymer but without the columns of core material, while simultaneously having a weight at least 10 percent less than the identical aggregate-fortified thermosetting polymer but without the columns of core material. The cast lightweight construction article can be made of recycled materials or other materials, such as materials that enable a lighter weight article having a weight reduced by an amount ranging from about 20 percent to about 50 percent. The cast lightweight construction article made of recycled materials, other materials, and/or materials that enable a lighter weight article can have the same load bearing characteristic as the cast lightweight construction article made of a non-recycled aggregate-fortified thermosetting polymer.

One or more embodiments of the method can include adding heat to the environment around the form, or directly to the form. For example, the amount of heat added can be enough to increase the temperature of the environment around the form or of the form by about 20 degrees Fahrenheit to 50 degrees Fahrenheit above the ambient air temperature around the form. The added heat can achieve a faster cure time for the article, such as a cure time that is at least 20 percent faster.

The low moisture content aggregate can include expanded polymer particles having an inner cell wall thickness of at least 0.15 microns. For example, the low moisture content aggregate can be Ohio sands, Illinois sands, or fine aggregate with a particulate diameter ranging from about 0.0029 inches to about 0.125 inches. The low moisture content aggregate can be a coarse aggregate with a particulate diameter that is variable, and can range from about 0.125 inches to about 1.5 inches. The low moisture content aggregate can be fillers, such as ceramic spheres with a particulate diameter ranging from about 0.03125 inches to about 1 inch.

The low moisture content aggregate can be a glass fiber, such as ADVANTEX® glass fiber or fibers of fiberglass available from Owens Corning. The low moisture content aggregate can be shredded plastic waste, such as shredded plastic bags or shredded milk bottles. The low moisture content aggregate can be plastic filler, such as polystyrene or polypropolene. The low moisture content aggregate can be composite fillers, such as plastic filler, such as recycled fiberglass boats, wind blades, automotive parts, or bathtubs. The low moisture content aggregate can be organic fillers, such as pecan shells, bagasse, coconut husks, or combinations thereof.

The aggregate-fortified thermosetting polymer can include a liquid thermosetting resin, such as a vinyl ester resin, a styrene-free vinyl ester resin, an unsaturated polyester resin, a styrene-free unsaturated polyester resin, an epoxy resin, other thermosetting resins known to those skilled in the art, or combinations thereof, such as those available from NOVOC® Resins of Andara, LLC.

The aggregate-fortified thermosetting polymer can include a liquid catalyst that enchances hardening of the aggregate-fortified thermosetting polymer. The liquid catalyst can be: an aliphatic amine, such as D.E.H. 24 available from Dow Chemical; an aromatic amine, such as Amicure 101 available from Air Products & Chemicals; a ketimine, such as ANCAMINE® 2457 available from Air Products & Chemicals; an anhydride, such as LINDRIDE® 29 available from Lindau Chemical; a peroxide, such as NORAC® 9H available from Syrgis; or a methyl ethyl ketone, such as Methyl Ethyl Ketone available from Exxon Corp, Exxon Chemical Americas Division.

The method can be used to create various kinds of shaped lightweight cast construction articles.

One or more embodiments of the method for forming a cast lightweight construction article can be implemented without using the metal cage. For example, each column of core material can have a holding means.

The holding means can be a solid non-floating, non-deforming holding means. Each holding means can be a solid rod that axially extends through a column of core material and through opposing walls of the form. The holding means can be a pair of short rods, with each short rod extending into one end of a column of core material and through a wall of the form. The holding means can retain the columns of core material away from the walls of the form.

Each holding means can be a saddle mounted to the interior portion of the walls of the form. Each column of core material can rest in one saddle at one end, and on the other saddle at the other end. The saddles can retain the columns of core material without piercing or penetrating the columns of core material.

Once the columns are supported by the holding means in the form, the resin of the aggregate-fortified thermosetting polymer can be added into the form. For example, the aggregate-fortified thermosetting polymer can be flowed into the form, and through and around the columns of core material, encapsulating the columns of core material.

In one or more embodiments of the method can include positioning one or more of the columns of core material in a first direction to form at least a first row, and then positioning one or more of the columns of core material in a second direction to form at least a second row. The second direction can be oriented at an angle from the first direction, such as at a 45 degree angle. The combination if the first row and the second row can form a hatch pattern of the columns of core material, which can provide additional structural support at various points in the formed article, enhancing the formed article.

The aggregate-fortified thermosetting polymer can be allowed to cure at a low temperature and for a cure time as described herein.

The form can then be removed. In embodiments with rods as the holding means, the rods can remain within the article. In embodiments with saddles as the holding means, the saddles can be removed when the form is removed. As such, a cast lightweight construction article that achieves a load bearing property substantially similar to cast articles made from an identical aggregate-fortified thermosetting polymer without the columns of core material and the holding means can be form, and can have a weight at least 10 percent less than cast articles made from an identical aggregate-fortified thermosetting polymer without the columns of core material and the holding means without requiring the use of heat.

In one or more embodiments, the method can include using the holding means and adding heat to the environment around the form, or directly to the form to achieve a faster cure time for the article.

In one or more embodiments, with rods as the holding means, each rod can penetrate an end of a column of core material to a distance from about 2 percent a length of the column of core material to about 20 percent the length of the column of core material. Each rod can extend through the form.

The cast lightweight construction articles formed from the method described herein can have the benefits of having a lower overall installation costs because they can be lighter than similar materials, and a longer life because the aggregate fortified thermosetting resin can resist degradation in harsh environments. The cast lightweight construction articles can be more abrasion resistant than non-resin articles. The cast lightweight construction articles can be non-electrically conductive for use in electrically conductive environments. The cast lightweight construction articles can be more ductile than other materials, particularly in cold climates. The cast lightweight construction articles can be homogenously corrosion resistant, in-part due to the simultaneous mixing of the ingredients instead of pouring the ingredients into the form separately.

Example 1

One Column in a Metal Cage

The composition formed in Example 1 can be used to make walls for a building, walls for office building, walls for a house, walls for a shed, a tunnel, a pipe, a bridge deck, railroad ties, or a span and supports for a bridge for transporting cars.

The composition formed in Example 1 can be used to make a lightweight construction article containing a lightweight resin based polymer concrete composition.

The lightweight resin based polymer concrete composition can include several components.

A first component can be 9.8 percent by weight of a liquid thermosetting resin composition. The liquid thermosetting resin composition can include: styrene-free vinyl ester resins, styrene-free unsaturated polyester resin, epoxy resins, or combinations thereof. For example, the styrene-free vinyl ester resin can be NOVOC® #4982 made by Andara, LLC. The styrene-free unsaturated polyester resin can be NOVOC® #8124 made by Andara, LLC. The epoxy resin can be one made by Huntsman Chemical.

A second component of the lightweight resin based polymer concrete composition can be a low moisture content aggregate having an average particle diameter ranging from about 6 microns to about 1.5 inches, and a bulk density ranging from about 75 lbs/cu.-ft. to about 160 lbs./cu.-ft. The low moisture content aggregate can constitute about 90 percent by weight of the lightweight resin based polymer concrete composition. About 2 percent by weight of the 90 percent by weight of the low moisture content aggregate can be granite particles. About 8 percent by weight of the 90 percent by weight of the low moisture content aggregate can be barium sulfate. The remainder of the low moisture content aggregate can be silica quartz.

The low moisture content aggregate can be sand, fine aggregate having diameters ranging form about 6 microns to about 3175 microns, or coarse aggregate with diameters ranging from about 0.125 inches to about 1.5 inches. The low moisture content aggregate, such as the course aggregate, can have an irregular shape, such as two particles of one size connected to a third particle of another size. The low moisture content aggregate can be or can include plasticizers and/or fibers, such as fiber glass cut into short strands and having a length of no longer than 1.5 inches. In embodiments, the low moisture content aggregate can be expanded polymer particles having an inner cell wall thickness of at least at least 0.15 microns.

The low moisture content aggregate can be or can include renewable resource fillers, such as jute, flax, cotton, or various plant fibers; or recycled fillers, such as porcelain, silica glass, or alloys.

A third component of the lightweight resin based polymer concrete composition can be 0.2 percent by weight of a liquid catalyst that enchances hardening of the lightweight resin based polymer concrete composition. The liquid catalyst can be cumine hydrogen peroxide, for example.

A fourth component of the lightweight resin based polymer concrete composition can be from 0.5 percent by weight to about 3 percent by weight of a catalyst that contains at least 0 percent by weight to 1 percent by weight of a metal carboxylate, such as Norac 9H made by Syrgis.

During formation of the composition of Example 1, the combination of these the first component, the second component, the third component, and the fourth component will not exceed 100 volume percent or 100 percent by weight. The resultant lightweight resin based polymer concrete composition of Example 1 can have a density ranging from about 120 lb./cu.-ft. to about 170 lb./cu.-ft.

To form a cast lightweight construction article, a metal cage with a top, a bottom, and at least one side connecting the top and the bottom can be used. The metal cage can be a cylindrical cage, a square cage, a rectangular cage, or another shaped cage.

A singe column of core material can be placed within the metal cage, which can be a 1.5 cu.ft. expanded polystyrene column The single column of core material can be disposed across the length of the metal cage. The combination of the first component, the second component, the third component, and the fourth component can be flowed over the single column of core material in the metal cage and allowed to cure, after which the formed cast lightweight construction article can be removed from the metal cage or the metal cage can be removed from the formed cast lightweight construction article.

The single column of core material can made of various compositions, as described herein. STYROFOAM™ can be used as the single column of core material for Example 1.

Example 2

Multiple Lightweight Cylinders in a Metal Cage

The composition of Example 1, including the combination of the first component, the second component, the third component, and the fourth component, can be used in Example 2, but with multiple columns of core material rather than a single column of core material.

The multiple columns of core material can be positioned within the metal cage. Each column of core material can have a diameter ranging from about 0.025 inches to about 24 inches. The columns of core material can placed within the metal cage with a spacing between each column of core material of 3 inches. The columns of core material can be hollow and formed from a low density alpha olefin type plastic.

Once the multiple columns of core material are aligned in the metal cage, the metal cage can be surrounded by a form. The form can be made from various materials of construction, such as wood, metal, fiberglass, or concrete.

The composition of Example 1, including the combination of the first component, the second component, the third component, and the fourth component, or another embodiment of the aggregate-fortified thermosetting polymer, can be flowed into the form.

The liquid thermosetting resin composition can be uniformly blended simultaneously with the low moisture content aggregate and the catalyst for a time ranging from about 2 minutes to about 10 minutes to obtain the aggregate-fortified thermosetting polymer, which can be a homogeneous mixture.

The homogeneous mixture can be poured into the form and allowed to cure or set for several minutes and up to several hours.

The form can then be removed. The resultant cast lightweight construction article can have a compressive strength of at least 7000 psi within 30 hours as tested according to ASTM C39 without the use of post-curing.

Example 3

Two Thick Columns in a Metal Cage

Example 3 can include a cast lightweight construction article made substantially as described herein, such as in Examples 1 and 2, but with the addition of heat.

The aggregate-fortified thermosetting polymer can be formed using 9.95 percent by weight of a liquid thermosetting resin composition, 90 percent by weight of a low moisture content aggregate, and 0.05 percent by weight of a liquid catalyst that enhances hardening.

At least two columns of core material can be positioned in the metal cage and disposed from one side wall of the metal cage to the opposite side wall of the metal cage.

The form can be positioned around the metal cage, or the metal cage can be placed in the form. The form can be configured to be sealed, such that the aggregate-fortified thermosetting polymer cannot leak out.

The liquid and dry particles can be mixed, forming the aggregate-fortified thermosetting polymer. The aggregate-fortified thermosetting polymer can be flowed into the form, and through and around the metal cage and the columns of core material, encapsulating the columns of core material.

The aggregate-fortified thermosetting polymer can be allowed to cure at a temperature of at least 50 degrees Fahrenheit for a cure time ranging from about 1 hour to about 30 hours. For example, in one or more embodiments, the cure time can be 3 hours.

Heat can be added to the form, such as by using a direct heat source that raises the temperature of the form by about 25 degrees Fahrenheit. The increase in temperature can reduce the cure time needed to cure the aggregate-fortified thermosetting polymer. The application of low heat can reduce the cure time by about 50 percent in one or more embodiments.

Example 4

Floating Holding Means Holding Multiple Columns and No Metal Cage

The cast lightweight construction article can contain the lightweight resin based polymer concrete composition made from the first component, the second component, and the third component of Example 1.

To form a solid cast, lightweight polymer article, a first and second column of core material can both be oriented in parallel to each other in a form. The first and second columns of core material can be square columns or round columns. Each column of core material can be made from the same low density expanded polystyrene, and can additionally contain low density polyurethane foam pieces.

At least two holding means, such as central solid non-floating non-deforming holding means, can be used. For example, the holding means can be short rods from about 1 inch to about 6 inches long. Each short rod can be inserted into an end of one of the columns of core material, and through a wall of the form. As such, the short rods can be used to support the columns of core material.

For example, a first holding means can be disposed axially through the first column of core material, and a second holding means can be disposed axially into the same column of core material at the opposite end. This step can be repeated for each column of core material. The short rods can be configured to not extend the entire length of the columns of core material.

An embodiment of the aggregate-fortified thermosetting polymer can be flowed into the form, encapsulating the columns of core material while the holding means support the columns of core material.

The aggregate-fortified thermosetting polymer can be allowed to set or cure for a time ranging from several minutes to several hours, forming the cast lightweight construction articles.

The liquid thermosetting resin composition can be blended simultaneously with the low moisture content aggregate, the catalyst that enhances hardening, and the catalyst (the fourth component of Example 1), to form a uniform aggregate-fortified thermosetting polymer. For example, the liquid and the dry materials can first be blended together for a time ranging from about 2 minutes to about 5 minutes to obtain the aggregate-fortified thermosetting polymer.

The aggregate-fortified thermosetting polymer can then be flowed into the form, and through and around the columns of core material. The aggregate-fortified thermosetting polymer can be allowed to cure at a temperature of about 70 degrees Fahrenheit. For example, the temperature of the cure can be at ambient temperature. Once cured, the holding means and the form can be removed.

Turning now to the Figures, FIG. 1A depicts a cross section of a side view of a metal cage 14 disposed within a form 22 usable for forming a cast lightweight construction article.

The columns of core material 12a, 12d, 12g, and 12j can be engaged at each end with the metal cage 14 within the form 22. The metal cage 14 can support the columns of core material 12a, 12d, 12g, and 12j above the bottom of the form 22.

With the columns of core material 12a, 12d, 12g, and 12j engaged with the metal cage 14 in the form 22, an aggregate-fortified thermosetting polymer 16 can be poured, or can otherwise flow into the form 22. The aggregate-fortified thermosetting polymer 16 can surround the columns of core material 12a, 12d, 12g, and 12j within the form 22, and can completely encapsulate the columns of core material 12a, 12d, 12g, and 12j. The aggregate-fortified thermosetting polymer 16 can have low moisture content agglomerates 18a, 18b, and 18c disposed therein. For example, the low moisture content agglomerates 18a, 18b, and 18c can be quartz silica with a density of about 145 pounds per cubic foot.

FIG. 1B depicts a cast lightweight construction article 8 after the form and the metal cage have been removed. The cast lightweight construction article 8 can include the aggregate-fortified thermosetting polymer with the low moisture content agglomerates encapsulated about the columns of core material. The cast lightweight construction article 8 can have I-beams 10a, 10c, 10e, 10g, and 10i, which can provide structural integrity and strength to the cast lightweight construction article 8, while the columns of core material can provide a lightweight property to the cast lightweight construction article 8. The cast lightweight construction article 8 can also include half I-beams at each end, such as half I-beams 11a and 11b.

FIG. 2 depicts a cross section of a cast lightweight construction article 8 having columns of core material with two different configurations.

A first column of core material 12a can have a cylindrical geometry. A second column of core material 13a can be a super elliptical configuration with two planar sides.

Both columns of core material 12a and 13a can be disposed within the aggregate-fortified thermosetting polymer 16 having the low moisture content agglomerates 18a, 18b, and 18c.

FIG. 3 depicts a top view of a form 22 with various holding means holding columns of core material.

For example, a first column of core material 12a can be retained within the form 22 by a first short rod 20a penetrating a first end of the first column of core material 12a, and by a second short rod 20b penetrating a second end of the first column of core material 12a. In operation, a user can use knobs, such as knob 21, to penetrate the short rods into the columns of core material.

The holding means can also include a solid rod 30 that extends between the opposite walls of the form 22 and completely through a tenth column of core material 12j.

The short rods 20a and 20b and the solid rod 30 can have diameters ranging from about ⅛ of an inch to about 2 inches, can be hollow or solid, and can be made of carbon steel, stainless steel, or fiberglass. In embodiments, the short rods 20a and 20b and the solid rod 30 can be threaded into the columns of core material for a more secure engagement.

The holding means can also include a pair of saddles, including a first saddle 32a and a second saddle 32b. The columns of core material can rest upon the pair of saddles 32a and 32b, which can suspend the columns of core material above a bottom of the form 22.

FIG. 4 depicts an embodiment of a method for forming a cast lightweight construction article.

The method can include positioning columns of core material in a metal cage, as illustrated by box 1000.

The method can include positioning a form around the metal cage, as illustrated by box 1002.

The method can include blending together liquid and dry materials forming an aggregate-fortified thermosetting polymer, as illustrated by box 1004.

The method can include pouring the aggregate-fortified thermosetting polymer in the form, and through and around the at least two columns of core material, encapsulating the at least two columns of core material, as illustrated by box 1006.

The method can include reducing a cure time by: adding heat to an environment around the form and/or to the form to achieve a faster cure time, as illustrated by box 1008.

The method can include allowing the aggregate-fortified thermosetting polymer to cure, as illustrated by box 1010.

The method can include removing the form, forming the cast lightweight construction article, as illustrated by box 1012.

The method can include making: a fluid conduit, a fluid containment structure, a support structure, a railroad tie, a beam, a bridge deck, a manhole cover, a manhole structure, a segmented tunnel for underground vehicular traffic or pedestrian traffic, a floor slab, a structure for bridges, a structure that supports vehicular and pedestrian traffic, a construction material used for commercial and industrial framed buildings, a short or medium span bridge or tunnel, a wall for a building, a wall for an office building, a wall for a house, a wall for a shed, a tunnel, or a pipe from the lightweight construction article, as illustrated by box 1014.

FIG. 5 depicts an embodiment of a method for forming a cast lightweight construction article.

The method can include disposing a first holding means to axially support a first column of core material, as illustrated by box 2000.

The method can include disposing a second holding means to axially support a second column of core material, as illustrated by box 2002.

The method can include positioning the first and second columns of core material with the first and second holding means in a form, as illustrated by box 2004.

The method can include blending together liquid and dry materials forming an aggregate-fortified thermosetting polymer, as illustrated by box 2006.

The method can include flowing the aggregate-fortified thermosetting polymer into the form, and through and around the first column of core material and the second column of core material, encapsulating the columns of core material, as illustrated by box 2008.

The method can include reducing a cure time by: adding heat to an environment around the form and/or to the form to achieve a faster cure time, as illustrated by box 2010.

The method can include allowing the aggregate-fortified thermosetting polymer to cure, as illustrated by box 2012.

The method can include removing the form and the holding members forming the cast lightweight construction article, as illustrated by box 2014.

While these embodiments have been described with emphasis on the embodiments, it should be understood that within the scope of the appended claims, the embodiments might be practiced other than as specifically described herein.

What is claimed is:

1. A cast lightweight construction article made by a process comprising:
   a. positioning a plurality of columns of a core material that are substantially solid in a removable form, wherein each of the columns of core material are substantially parallel, each of the columns of core material having a cylindrical geometry, wherein the cylindrical geometry is substantially circular or substantially elliptical in cross section, wherein each column of core material comprises: an expanded polystyrene, a urethane foam, a polymerized alpha olefin, or combinations thereof;
   b. blending together liquid and dry materials for a time ranging from 2 minutes to 10 minutes, forming an aggregate-fortified thermosetting polymer concrete, wherein a total weight percent of the aggregate-fortified thermosetting polymer is 100 percent, and wherein the liquid and dry materials comprise:
      (i) from 7 percent by weight to 17 percent by weight of a liquid thermosetting resin composition, wherein the liquid thermosetting resin composition is a vinyl ester resin, a styrene-free vinyl ester resin, an unsaturated polyester resin, a styrene-free unsaturated polyester resin, or combinations thereof;
      (ii) from 60 percent by weight to 93 percent by weight of an aggregate having an average particle diameter ranging from 6 microns to 1.5 inches, and a bulk density ranging from 75 pounds per cubic foot to 160 pounds per cubic foot; and
      (iii) from 0.2 percent by weight to 3 percent by weight of a liquid catalyst for enhancing hardening, wherein the liquid catalyst is an aliphatic amine, an aromatic amine, a ketamine, a methyl ketamine, an anhydride, a peroxide, or a methyl ethyl ketone;
   c. pouring the aggregate-fortified thermosetting polymer in the removable form, and through and around the plurality of columns of the core material, encapsulating the plurality of columns of the core material;

d. allowing the aggregate-fortified thermosetting polymer to cure, forming a substantially arched internal structure encompassing the core material; and e. removing the form, forming the cast lightweight construction article with the substantially arched internal structure.

2. The cast lightweight construction article of claim 1, wherein the cast lightweight construction article is: a fluid conduit, a fluid containment structure, a support structure, a railroad tie, a beam, a bridge deck, a manhole cover, a manhole structure, a segmented tunnel for underground vehicular traffic or pedestrian traffic, a floor slab, a structure for bridges, a structure that supports vehicular and pedestrian traffic, a construction material used for commercial and industrial framed buildings, a short or medium span bridge or tunnel, a wall for a building, a wall for an office building, a wall for a house, a wall for a shed, a tunnel, or a pipe.

3. A cast lightweight construction article made by a method comprising:

a. disposing a first holding means to axially support a first column of a cylindrical geometry core material that is substantially solid, wherein the cylindrical geometry is substantially circular or substantially elliptical in cross section;

b. disposing additional holding means to axially support additional columns of the cylindrical geometry core material that are substantially solid;

c. positioning the first column of the cylindrical geometry core material with the first holding means and the additional columns of the cylindrical geometry core material with the additional holding means in a form, wherein the first column of the cylindrical geometry core material is positioned substantially in parallel with the additional columns of the cylindrical geometry core material, and wherein each column of the cylindrical geometry core material comprises: an expanded polystyrene, a urethane foam, a polymerized alpha olefin, or combinations thereof;

d. blending together liquid and dry materials for a time ranging from 2 minutes to 10 minutes, forming an aggregate-fortified thermosetting polymer, wherein a total weight percent of the aggregate-fortified thermosetting polymer is 100 percent, wherein the liquid and dry materials comprise:

(i) from 7 percent by weight to 17 percent by weight of a liquid thermosetting resin composition, wherein the liquid thermosetting resin composition is a vinyl ester resin, a styrene-free vinyl ester resin, an unsaturated polyester resin, a styrene-free unsaturated polyester resin, or combinations thereof;

(ii) from 60 percent by weight to 93 percent by weight of an aggregate having an average particle diameter ranging from 6 microns to 1.5 inches, and a bulk density ranging from 75 pounds per cubic foot to 160 pounds per cubic foot; and (iii) from 0.2 percent by weight to 3 percent by weight of a liquid catalyst for enhancing hardening, wherein the liquid catalyst is an aliphatic amine, an aromatic amine, a ketamine, a methyl ketamine, an anhydride, a peroxide, or a methyl ethyl ketone;

e. flowing the aggregate-fortified thermosetting polymer into the form, and through and around the columns of core material, encapsulating the columns of core material;

f. allowing the aggregate-fortified thermosetting polymer to cure; and g. removing the form and the holding means, forming the cast lightweight construction article with a substantially arched internal structure;

h. allowing the aggregate-fortified thermosetting polymer to cure; and i. removing the form and the holding means, forming the cast lightweight construction article with the substantially arched internal structure.

4. The cast lightweight construction article of claim 3, further comprising: adding heat to an environment around the form to increase a temperature of the form by 20 degrees Fahrenheit to 30 degrees Fahrenheit above an ambient air temperature around the form to achieve a faster cure time.

5. The cast lightweight construction article of claim 3, wherein the aggregate-fortified thermosetting polymer is cured at a temperature ranging from 50 degrees Fahrenheit to 100 degrees Fahrenheit for a cure time ranging from 3 minutes to 30 hours.

6. The cast lightweight construction article of claim 3, wherein the cast lightweight construction article is: a fluid conduit, a fluid containment structure, a support structure, a railroad tie, a beam, a bridge deck, a manhole cover, a manhole structure, a segmented tunnel for underground vehicular traffic or pedestrian traffic, a floor slab, a structure for bridges, a structure that supports vehicular and pedestrian traffic, a construction material used for commercial and industrial framed buildings, a short or medium span bridge or tunnel, a wall for a building, a wall for an office building, a wall for a house, a wall for a shed, a tunnel, or a pipe.

7. The cast lightweight construction article of claim 3, wherein the cast lightweight construction article is: a fluid conduit, a fluid containment structure, a support structure, a railroad tie, a beam, a bridge deck, a manhole cover, a manhole structure, a segmented tunnel for underground vehicular traffic or pedestrian traffic, a floor slab, a structure for bridges, a structure that supports vehicular and pedestrian traffic, a construction material used for commercial and industrial framed buildings, a short or medium span bridge or tunnel, a wall for a building, a wall for an office building, a wall for a house, a wall for a shed, a tunnel, or a pipe.

\* \* \* \* \*